United States Patent
Hosseini et al.

(10) Patent No.: US 12,541,055 B2
(45) Date of Patent: Feb. 3, 2026

(54) ELECTRONIC DEVICE INCLUDING A LENS ASSEMBLY

(71) Applicant: Intel Corporation, Santa Clara, CA (US)

(72) Inventors: Kaveh Hosseini, Livermore, CA (US); Omkar Karhade, Chandler, AZ (US); Xiaoqian Li, Chandler, AZ (US); Chia-Pin Chiu, Tempe, AZ (US); Finian G. Rogers, Newbridge (IE)

(73) Assignee: Intel Corporation, Santa Clara, CA (US)

( * ) Notice: Subject to any disclaimer, the term of this patent is extended or adjusted under 35 U.S.C. 154(b) by 848 days.

(21) Appl. No.: 17/557,648

(22) Filed: Dec. 21, 2021

(65) Prior Publication Data
US 2023/0194783 A1    Jun. 22, 2023

(51) Int. Cl.
*G02B 6/122* (2006.01)
*G02B 6/12* (2006.01)
*G02B 6/30* (2006.01)

(52) U.S. Cl.
CPC ......... *G02B 6/122* (2013.01); *G02B 6/12004* (2013.01); *G02B 6/30* (2013.01); *G02B 2006/12102* (2013.01)

(58) Field of Classification Search
CPC ...................................................... G02B 6/30
See application file for complete search history.

(56) References Cited

U.S. PATENT DOCUMENTS

| | | | |
|---|---|---|---|
| 2018/0031791 A1* | 2/2018 | Israel | G02B 6/4206 |
| 2021/0132309 A1* | 5/2021 | Zhang | G02B 6/4249 |
| 2021/0141170 A1* | 5/2021 | Ueda | G02B 6/425 |

* cited by examiner

*Primary Examiner* — Charlie Y Peng
(74) *Attorney, Agent, or Firm* — Compass IP Law PC

(57) ABSTRACT

An electronic device may include a photonic integrated circuit (PIC) coupled with a substrate. The PIC may communicate a photonic signal with one or more optical fibers. The PIC may process the photonic signal into an electronic signal. The PIC may extend between a first end and a second end. An electronic integrated circuit (EIC) may be coupled with the substrate. The EIC may communicate with the PIC. The EIC may transmit the electronic signal to the PIC. The EIC may receive the electronic signal from the PIC. The electronic device may include a lens assembly. The lens assembly may be coupled with the first end of the PIC. In an example, optical interconnects of the PIC are aligned with the lens assembly such that the lens assembly is configured to transmit the photonic signal communicated between PIC and the optical fibers.

22 Claims, 4 Drawing Sheets

ELECTRONIC DEVICE INCLUDING A LENS ASSEMBLY

STATEMENT REGARDING FEDERALLY SPONSORED RESEARCH OR DEVELOPMENT

This invention was made with Government support under Agreement No. HR00111830002 awarded by the United States Department of Defense. The Government has certain rights in the invention.

TECHNICAL FIELD

This document pertains generally, but not by way of limitation, to an electronic device including one or more integrated circuits.

BACKGROUND

In an approach, fiber-optic communications includes transmitting light through one or more optical fibers (e.g., glass, plastic, or the like). The optical fiber may be coupled with a photonic integrated circuit ("PIC"). For instance, the optical fiber may be coupled with an edge coupler of the PIC. The optical fiber may transmit light from a source to the edge coupler of the PIC. The photonic integrated circuit may convert light to an electronic signal. In this approach, misalignment between the optical fiber (coupled to the PIC) and the edge connector may result in loss of one or more of the PIC or the optical fiber.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
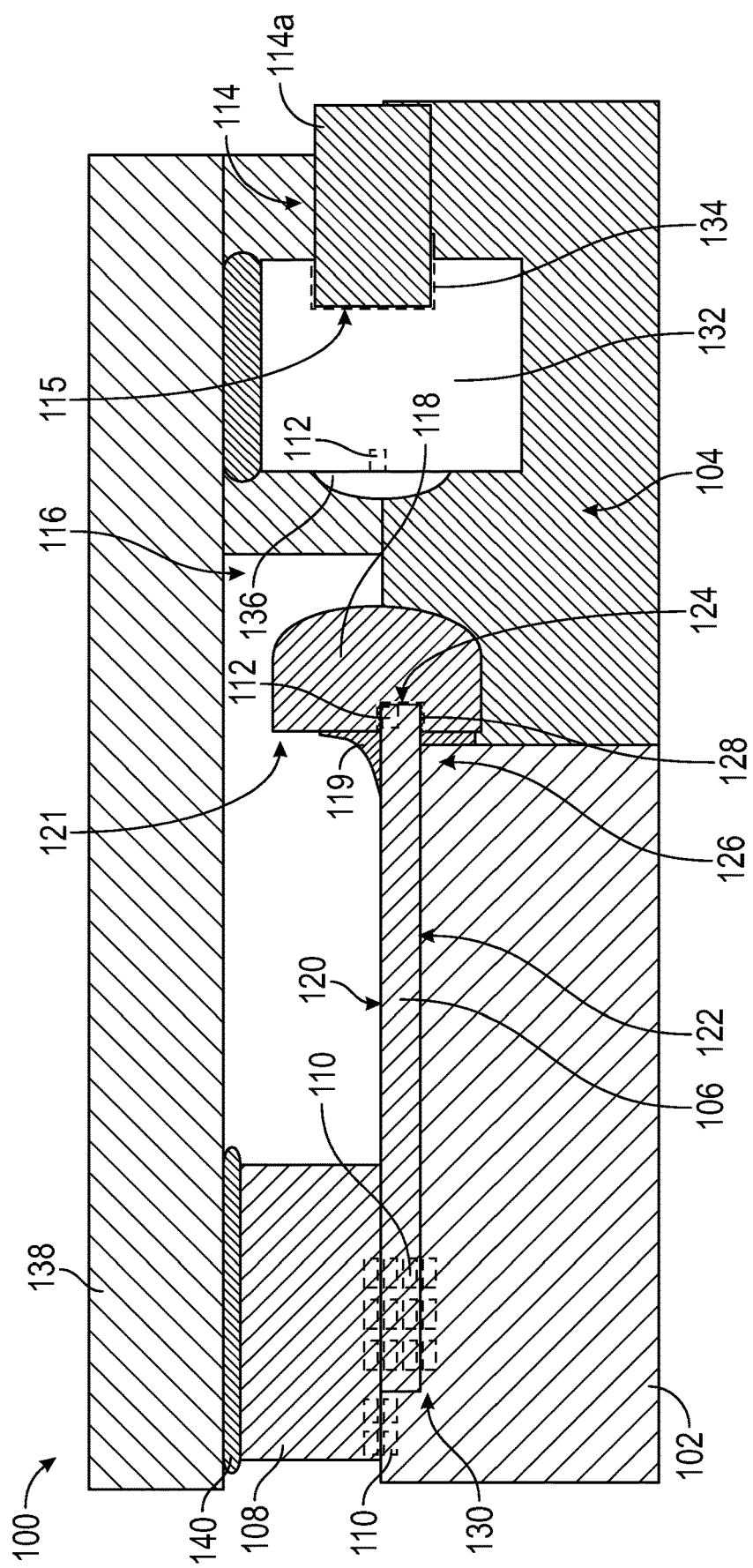
FIG. 1 shows a schematic diagram of an example of an electronic device.

The present inventors have recognized, among other things, that a problem to be solved may include optically interconnecting an optical fiber with a photonic integrated circuit ("PIC"). In some approaches, misalignment between the optical fiber and the PIC may result in loss of one or more of the PIC or the optical fiber. For instance, the PIC may include an optical interconnect (e.g., a waveguide, edge connector, or the like). Misalignment between the optical fiber and the optical interconnect may result in loss of one or more of the PIC or the optical fiber. In another approach, the photonic signal diverges as it travels between the PIC and the optical fiber. Accordingly, the integrity of the photonic signal may be degraded by divergence of the photonic signal during transmission between the PIC and the optical fiber. For example, the photonic signal may degrade as it travels to the point where the photonic signal is lost before reception at one or more of the PIC or optical fiber.

The present subject matter may help provide a solution to this problem, such as with a lens assembly. In an example, an electronic device may include the lens assembly. The lens assembly may focus a photonic signal transmitted by the electronic device. For instance, the lens assembly may focus a photonic signal transmitted between the PIC and the optical fiber.

In another example, the electronic device may include a substrate. The substrate may include one or more electrical traces and a dielectric material. The electronic device may include the photonic integrated circuit. The PIC may be coupled with the substrate. In some examples, the substrate includes a cavity. The cavity may receive one or more components of the electronic device. For instance, the cavity may help align a lens assembly with the PIC.

The PIC may include one or more optical interconnects. The PIC may communicate a photonic signal with one or more optical fibers. For instance, the optical interconnects may communicate with the optical fibers to transmit the photonic signal to (or receive the photonic signal from) the optical fibers. In another example, the PIC may process the photonic signal into an electronic signal. For instance, the PIC may convert one or more photons into an electrical current. The PIC may convert an electrical current into one or more photons.

The electronic device may include an electronic integrated circuit ("EIC"). The EIC may be coupled with the substrate. Accordingly, one or more of the EIC or the PIC may communicate with the substrate. In another example, the electronic integrated circuit may communicate with the photonic integrated circuit. For instance, the EIC may transmit an electrical signal to the PIC. The EIC may receive the electrical signal from the PIC. In an example, the EIC may generate an electronic signal. The EIC may transmit the electronic signal to the PIC. The PIC may process the electronic signal into a photonic signal. The PIC may transmit the photonic signal to one or more optical fibers. In another example, the PIC may receive the photonic signal from the optical fibers. The PIC may process the photonic signal into an electronic signal. The PIC may transmit the electronic signal to the EIC. Accordingly, the PIC may communicate with one or more of the EIC, the optical fibers, or the substrate.

As described herein, the electronic device may include a lens assembly. In an example, the lens assembly may include a spherical lens. For instance, the spherical lens may be coupled with the photonic integrated circuit. In another example, the optical interconnects may cooperate with the lens assembly to communicate the photonic signal with one or more optical fibers. For example, the photonic signal may be communicated between the PIC and the optical fibers using the lens assembly. In another example, the optical interconnects are aligned with the lens assembly. For instance, the photonic signal may be transmitted from the optical interconnects and through the lens assembly. The photonic signal may be transmitted from the lens assembly to the optical fibers. In yet another example, the photonic signal may be transmitted from the optical fibers to the lens assembly. The photonic signal may be transmitted from the lens assembly to the optical interconnects of the PIC. Accordingly, the photonic signal may be transmitted through the lens assembly during communication between the photonic integrated circuit and the one or more optical fibers.

In an example, the lens assembly cooperates with the PIC to optically interconnect the PIC with an optical fiber. For example, the lens assembly may focus (e.g., collimate, concentrate, direct, refract, bend, gather, collect, converge, narrow, sharpen, diverge, broaden, expand, or the like) the photonic signal communicated between the PIC and the optical fiber. Accordingly, the lens assembly may cooperate with one or more of the PIC or the optical fiber to optically interconnect the PIC with the optical fiber. For instance, the lens assembly may include one or more lenses. The one or more lenses may focus the photonic signal to increase the distance the photonic signal travels before the photonic signal degrades to a point of being lost. The lens assembly may focus the photonic signal to facilitate alignment between the PIC and the optical fibers. In another example, the lenses may increase the distance the photonic signal travels while maintaining integrity of the photonic signal. In yet another example, the optical interconnect of the PIC may transmit the photonic signal through the lenses. The lenses may focus the photonic signal, for instance to reduce divergence of the photonic signal as the photonic signal is transmitted to the optical fibers. In another example, the lens assembly may reduce degradation of the photonic signal during transmission of the photonic signal between components of the electronic device. For instance, the lens assembly may reduce loss of the photonic signal before reception at one or more of the PIC or the optical fiber. Accordingly, the lens assembly may improve the performance of the electronic device, for example by enhancing transmission of a photonic signal between components of the electronic device.

In yet another example, the lens assembly may include a first lens. The first lens may be coupled with the PIC. In an example, the first lens may be coupled with an end of the PIC. For instance, the first lens may receive a portion of the PIC. In an example, the first lens may include a socket. The socket may receive an edge of the PIC. In another example, the first lens may be coupled with the edge of the PIC.

In still yet another example, the first lens may be coupled with one or more surfaces of the PIC. For example, the PIC may include a first surface (e.g., top surface, or the like). The PIC may include a second surface (e.g., bottom surface, or the like). The edge may extend between the first surface and the second surface. The first lens may be coupled with one or more of the first surface, the second surface, or the edge. Accordingly, in some examples, the first lens may sandwich (e.g., squeeze, surround, compress, confine, or the like) the end of the PIC. For instance, the first surface and second surface of the PIC may be sandwiched by the first lens. In another example, the first lens may be directly adjacent the edge of the PIC.

The lens assembly may cooperate with the PIC to inhibit warping (e.g., deflection, distortion, bending, curving, twisting, misshaping, or the like) of the PIC. Accordingly, the lens assembly may enhance performance of the electronic device. For example, a thickness of the PIC may correspond to the dimension between the first surface and second surface of the PIC. In some approaches, the PIC may warp. For instance, the PIC may be more prone to warping as the thickness of the PIC is reduced. Thus, in an approach, optical interconnects of the PIC may be misaligned with respect to other components of the electronic device.

Coupling the lens assembly with the end of the PIC may inhibit warping of the PIC. For instance, coupling the lens assembly with the end of the PIC may enhance rigidity of the PIC. In another example, sandwiching the end of the PIC with the lens assembly may enhance the rigidity of the PIC. Enhancing the rigidity of the PIC may reduce warping of the PIC. In yet another example, coupling with the lens assembly with the end of the PIC minimizes misalignment between the optical interconnects of the PIC and the lens assembly (or other components of the electronic device). In yet another example, the lens assembly may warp in correspondence with the PIC. For instance, the lens assembly may be flexible. Thus, the lens assembly may maintain alignment with the PIC even if the PIC warps. Accordingly, the lens assembly may cooperate with the PIC to minimize misalignment between the lens assembly and the PIC (or other components of the electronic device).

This overview is intended to provide an overview of subject matter of the present patent application. It is not intended to provide an exclusive or exhaustive explanation of the present patent application. The Detailed Description continues, and provides further information about the present patent application.

FIG. 1 shows a schematic diagram of an example of an electronic device 100. The electronic device 100 may facilitate fiber-optic communications. For instance, the electronic device 100 may receive a photonic signal transmitted over one or more optical fibers. The electronic device 100 may process the photonic signal into an electronic signal. The electronic device 100 may communicate the electronic signal to other components of the electronic device 100.

In an example, the electronic device 100 may include a substrate 102. The substrate 102 may comprise a cavity 104. In an example, one or more components of the electronic device 100 may be coupled with the substrate 102. For instance, the one or more components may be located in the cavity 104 and coupled with the substrate 102. The substrate 100 may communicate signals between the components of the electronic device 100.

The electronic device 100 may include a photonic integrated circuit 106 ("PIC 106"). In an example, the photonic integrated circuit 106 may include one or more of indium phosphide, or silicon nitride (however the present subject matter is not so limited). The photonic integrated circuit 106 may process a photonic signal into an electronic signal. In another example, the PIC 106 may process (e.g., convert, change, transform, translate, transduce, or the like) the electronic signal into the photonic signal. For instance, the PIC 100 may process the photonic signal to correspond with the electronic signal. In another example, one or more of the photonic signal or the electronic signal may correspond with data (e.g., an analog signal, digital signal, or the like).

In another example, the electronic device 100 may include an electronic integrated circuit 108 ("EIC 108"). In an example, the electronic integrated circuit 108 may include silicon (however the present subject matter is not so limited). The EIC 108 may be coupled with the PIC 106. For instance, the electronic integrated circuit 108 may communicate with the photonic integrated circuit 106. In an example, the EIC 108 may communicate the electronic signal with the PIC 106. In another example, the EIC 108 may communicate with other integrated circuits, including (but not limited to) a CPU, memory FPGA, or switch ASIC. For instance, the EIC 108 and the other integrated circuits may be included in a package. In another example, the EIC 108 communicates with the other integrated circuits using an interconnect bridge.

Additionally, the electronic device 100 may include one or more electrical interconnects 110. The electrical interconnects 110 may facilitate communication of the electronic signal between components of the electronic device 100. For instance, the EIC 108 may communicate the electronic signal with the PIC 106 using the electrical interconnects 110. In yet another example, the EIC 108 may communicate the electronic signal with the substrate 102 using the electrical interconnects 110. In still yet another example, the PIC 108 may communicate the electronic signal with substrate 102 using the electrical interconnects 110.

Referring to FIG. 1, the photonic integrated circuit 106 may include one or more optical interconnects 112. The optical interconnects 112 may facilitate communication of the photonic signal. For instance, the optical interconnects 112 may communicate with one or more optical fibers 114 to transmit a photonic signal to (or receive the photonic signal from) the optical fibers 114. In another example, the optical interconnects 112 may include one or more of a waveguide, edge connector, optical sensor, diode, laser, or the like.

The electronic device 100 may include a lens assembly 116. The lens assembly 116 may focus a photonic signal transmitted by the electronic device 100. For instance, the lens assembly 116 may focus a photonic signal transmitted between the PIC 106 and the optical fibers 114. In an example, the lens assembly may include a first lens 118. The first lens 118 may be coupled with the photonic integrated circuit 106. For example, the photonic signal may be communicated between the PIC 106 and the optical fibers 114 using the first lens 118. In an example, the optical interconnects 112 may cooperate with the lens assembly 116 to communicate the photonic signal with the one or more optical fibers 114. In another example, the optical interconnects 112 may be aligned with the lens assembly 116. For instance, the photonic signal may be transmitted from the optical interconnects 112 and through the first lens 118. The photonic signal may be transmitted from the first lens 118 to the optical fibers 114. In yet another example, the photonic signal may be transmitted from the optical fibers 114 to the first lens 118. The photonic signal may be transmitted from the first lens 118 to the optical interconnects 112. Accordingly, the photonic signal may be transmitted through the first lens 118 during communication between the photonic integrated circuit 106 and the one or more optical fibers 114.

The first lens 118 may be coupled with the photonic integrated circuit 106. For instance, the PIC 106 may include a first surface 120 (e.g., top surface, or the like). The PIC may include a second surface 122 (e.g., bottom surface, or the like). In an example, an edge 124 extends between the first surface 120 and the second surface 122. For instance, the edge 124 of the PIC 106 may be located a first end 126 of the PIC 106. The first lens 118 may be coupled with the edge 124 of the PIC 106. For instance, the first lens 118 may form a direct interface with the PIC 106.

In an example, the first lens 118 may include a PIC socket 128 (shown in dashed lines in FIG. 1) that receives the PIC 106. In an example with the PIC 106 received in the PIC socket 128 of the first lens 128, the edge 124 may form a direct interface with the first lens 128. In yet another example, the optical interconnects 112 may be located proximate the surface 120 of the PIC 106. In another example, the optical interconnects 112 may located proximate the edge 124 of the PIC. For instance, the optical interconnects 112 may be exposed at the edge of the PIC 106 (or at the surface 120). In an example, the optical interconnects are recessed with respect to an exterior surface (e.g., the edge 124, surface 120, or the like) of the PIC 106. In another example, the optical interconnects 112 may be exposed at the edge 124 to facilitate transmission of the photonic signal. In yet another example, the optical interconnects 112 may be located in the PIC socket 128 with the first lens 118 coupled with the PIC 106. For instance, the first lens 118 may cover (e.g., enclose, shroud, encase, shield, or the like) the optical interconnects 112. Accordingly, the optical interconnects 112 may direct the photonic signal transmitted through the first lens 118.

The first lens may be coupled with one or more of the first surface 120, the second surface 122, or the edge 124. Accordingly, in some examples, the first lens 118 may sandwich (e.g., squeeze, surround, compress, confine, or the like) the end 126 of the PIC 106. For instance, the first surface 120 and second surface 122 of the PIC 106 may be sandwiched by the first lens 108. In another example, the first lens 108 may be directly adjacent the edge 124 of the PIC 106.

In an example, the electronic device 100 may include an adhesive 119 the adhesive 119 may enhance the coupling between the lens assembly 116 and components of the electronic device 100. For instance, the adhesive 119 may enhance the coupling forces between first lens 118 and the PIC 106. In an example, the adhesive 119 may be coupled with a first face 121 of the lens 118. The adhesive 119 may be coupled with the first surface of the PIC 106. The adhesive may be coupled with the substrate 102. The adhesive 119 may be located between the first surface 120 and the first lens 118. For instance, the adhesive 119 may be located in the PIC socket 128. In another example, the adhesive 119 may be located between the second surface 122 and the first lens 118. In yet another example, the adhesive 119 may be located between the first face 121 of the lens 118 and the substrate 102.

The lens assembly 116 may cooperate with the PIC 106 to inhibit warping (e.g., deflection, distortion, bending, curving, twisting, misshaping, or the like) of the PIC 106. Accordingly, the lens assembly 116 may enhance performance of the electronic device 100. For example, a thickness of the PIC 106 may correspond to the dimension between the first surface 120 and second surface 122 of the PIC 106. In some examples, the thickness of the PIC 106 may be less than approximately 200 microns (however the present subject matter is not so limited). In another example, the thickness of the PIC 106 may be within a range of approximately 100 microns to approximately 200 microns. In yet another example, the thickness of the PIC 106 may be within a range of approximately 50 microns to approximately 300 microns.

In some approaches, the PIC 106 may warp. For instance, the PIC 106 may be more prone to warping as the thickness of the PIC 106 is reduced. Thus, in an approach, optical interconnects 112 of the PIC 106 may be misaligned with respect to other components of the electronic device 100.

Coupling the lens assembly 116 with the end 126 of the PIC 106 may inhibit warping of the PIC 106. In an example, the lens assembly 116 may inhibit warping of the edge 124 of the PIC 106. In another example, coupling the lens assembly 116 with the end 126 of the PIC 106 may enhance rigidity of the PIC 106. In yet another example, sandwiching the end 126 of the PIC 106 with the lens assembly 116 (e.g., the first lens 118, or the like) may enhance the rigidity of the PIC 106. Enhancing the rigidity of the PIC 106 may reduce warping of the PIC 106. In yet another example, coupling with the lens assembly 116 with the end of the PIC 106 may minimize misalignment between the optical interconnects 112 of the PIC 106 and the lens assembly 116 (or other components of the electronic device 100). In still yet another example, the lens assembly 116 may warp in correspondence with the PIC 106. For instance, the lens assembly 116 may be flexible. Thus, the lens assembly 116 may maintain alignment with the PIC 106 even if the PIC 106 warps. Accordingly, the lens assembly 116 may cooperate with the PIC 106 to minimize misalignment between the lens assembly 116 and the PIC 106 (or other components of the electronic device 100).

In another example, the EIC 108 may be coupled with a second end 130 of the PIC 106. For instance, FIG. 1 shows the EIC 108 coupled with the first surface 120 at the second end 130 of the PIC 106. The cavity 104 of the substrate 102 may receive one or more of the PIC 106, EIC 108, lens assembly 116, or other components of the electronic device 100.

Referring to FIG. 1, the electronic device 100 may include a fiber array unit 132. The fiber array unit 132 may be located in the cavity 104. The fiber array unit 132 may couple with the one or more optical fibers 114. In an example, fiber array unit 132 may be coupled with an end 115 of the one or more optical fibers 114. In another example, the fiber array unit 132 may include a fiber socket 134. In yet another example, the fiber socket 134 may receive the end 115 of the optical fiber 114A. Accordingly, the one or more optical fibers 114 may couple with the fiber array unit 132.

In another example, the fiber array unit 132 may align the optical fibers 114 with the optical interconnects 112 of the photonic integrated circuit 106. In yet another example, the fiber array unit 132 separates the optical fibers 114 by a specified pitch. For instance, the fiber array unit may space a first optical fiber at a first pitch (e.g., distance, dimension, orientation, pattern, or the like) from a second optical fiber. In still yet another example, the fiber array unit may arrange the optical fibers in a specified configuration. For instance, coupling the optical fibers 114 with the fiber array unit 132 may arrange the optical fibers in a line. In another example, coupling the optical fibers 114 with the fiber array unit 132 may arrange the optical fibers in a grid. Accordingly, coupling the optical fibers 120 with the fiber array unit 132 may secure the optical fibers in a specified configuration. For example, coupling the optical fibers 114 with the fiber array unit 132 may align the optical fibers 114 with the optical interconnects 112 of the photonic integrated circuit 106. Thus, the fiber array unit 132 may cooperate with the optical fibers 114 and the PIC 106 to facilitate communication of the photonic signal between the optical fibers 114 and the PIC 106.

As described herein, the electronic device 100 may include the lens assembly 116. The lens assembly 116 may include a second lens 136. The second lens 136 may focus the photonic signal communicated between the PIC 106 and the optical fibers 114. In an example, the second lens 136 may be coupled with the fiber array unit 132. In another example, the second lens 136 may be aligned with the optical fibers 114. For instance, the fiber array unit 132 may include at least one of the second lens 136 aligned with an individual optical fiber of the one or more optical fibers 114. In an example, FIG. 1 shows optical fiber 114A aligned with the lens assembly 116 (including the second lens 136). In another example, the fiber array unit 132 includes the one or more optical interconnects 112. The lens assembly 116 may be aligned with the optical interconnects 112 of the fiber array unit 132. For instance, the optical interconnects 112 may communicate the photonic signal between the optical fibers 114 and the lens assembly 116 (e.g., the second lens 136, or the like). Thus, the lens assembly 116 cooperates with one or more of the PIC 106 or the optical fibers 114 to communicate the photonic signal between the PIC 106 and the optical fibers 114.

Referring to FIG. 1, the electronic device 100 may include a heat sink, for instance an integrated heat spreader 138. The integrated heat spreader 138 may enhance dissipation of heat from the components of the electronic device 100. For instance, the integrated heat spreader 138 may be coupled with one or more of the EIC 108, the PIC 106, the lens assembly 116, or the fiber array unit 132. In some examples, a thermal interface material 140 may be coupled between the integrated heat spreader 138 and components of the electronic device 100. For instance, the thermal interface material 140 may enhance heat transfer between the EIC 108 and the integrated heat spreader 138. Accordingly, the electronic device 100 may include the integrated heat spreader 138, for instance to enhance dissipation of heat from components of the electronic device 100.

Figure 2:
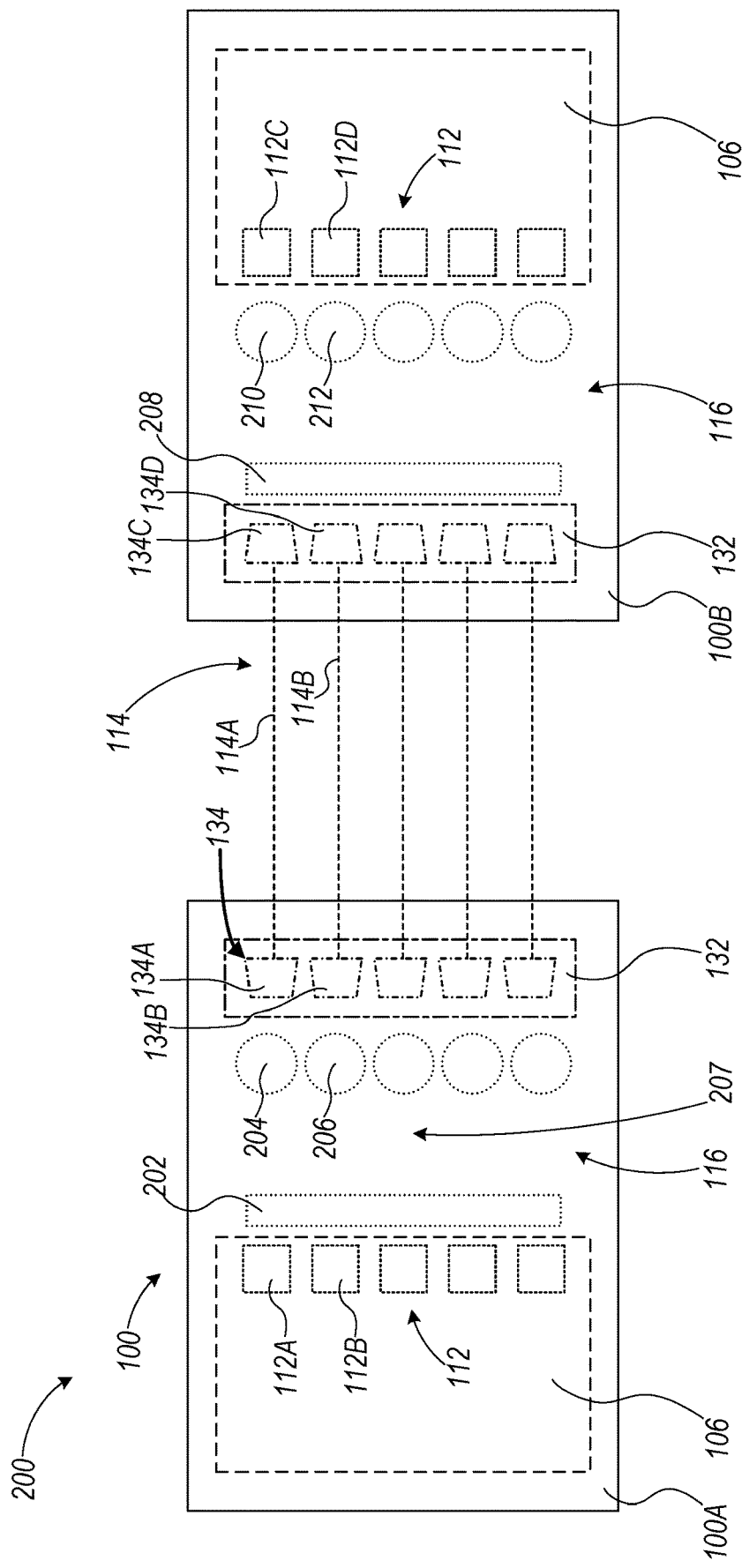
FIG. 2 shows an example of an electronic system.

FIG. 2 shows an example of an electronic system 200. In an example, the electronic system 200 may include two or more of the electronic device 100. For instance, the electronic system 200 may include a first electronic device 100A. The electronic system 200 may include a second electronic device 100B. The first electronic device 100A may communicate with the second electronic device 100B. For example, the one or more optical fibers 114 may facilitate communication between the first electronic device 100A and the second electronic device 100B. In another example, the electronic system 200 may communicate a photonic signal between the first electronic device 100A and the second electronic device 100B. For instance, the first optical fiber 114A may transmit the photonic signal between the first electronic device 100A and the second electronic device 100B. In another example, a second optical fiber 114B may transmit the photonic signal between the first electronic device 100A and the second electronic device 100B.

The electronic devices 100A, 100B may include the lens assembly 116. In an example, the first electronic device 100A may include one or more of a first lens 202, a second lens 204, or a third lens 206. In another example, the second electronic device 100B may include one or more of a fourth lens 208, a fifth lens 210, or a sixth lens 212.

The lens assembly 116 may focus the photonic signal communicated by electronic system 200. In an example, the first lens 202 may be coupled with the PIC 106 of the first electronic device 100A. In another example, a first optical interconnect 112A may be aligned with the first lens 202. A second optical interconnect 112B may be aligned with the first lens 202. The photonic signal communicated by the optical interconnects 112A, 112B of the PIC 106 may be transmitted through the first lens 202. Accordingly, the first lens 202 may be associated with one or more of the optical interconnects 112 of the PIC 106.

In another example, the fiber array unit 132 of the first electronic device 100 may include the second lens 204 and the third lens 206. For instance, the lens 204 may be aligned with a first fiber socket 134A. The lens 206 may be aligned with the second fiber socket 134B. Thus, the lenses 404, 406 may be aligned with individual ones of the fiber sockets 134. In yet another example, a photonic signal communicated by an optical fiber associated with the first fiber socket 134A (e.g., optical fiber 114A, or the like) may be transmitted through the lens 204. In still yet another example, a photonic signal communicated by an optical fiber associated with the second fiber socket 134B (e.g., optical fiber 114B, or the like) may be transmitted through the lens 206. Accordingly, the lenses 404, 406 may be associated with individual ones of the fiber sockets 115 (or individual ones of the fibers 114).

In another example, the lens assembly 116 may transmit the photonic signal across a transmission gap 207 (e.g., air gap, vacuum, space, or the like). For instance, the transmission gap 207 may separate the first lens 202 from one or more of the second lens 204 or the third lens 206. Accordingly, the electronic device 100 may transmit the photonic signal through the transmission gap 207 during communication between the PIC 106 and the optical fibers 114.

As described herein and referring to FIG. 2, the electronic system 200 may include the second electronic device 100B. The second electronic device 100B may include the lenses 208, 210, 212. In an example, the fourth lens 202 may be coupled with the fiber array unit 132 of the second electronic device 100A. In another example, a third fiber socket 134C may be aligned with the lens 208. A fourth fiber socket 134D may be aligned with the lens 208. A photonic signal communicated by an optical fiber associated with the third fiber socket 134C (e.g., optical fiber 114A, or the like) may be transmitted through the lens 208. In still yet another example, a photonic signal communicated by an optical fiber associated with the fourth fiber socket 134D (e.g., optical fiber 114B, or the like) may be transmitted through the lens 208. Accordingly, the fourth lens 202 may be associated with one or more of the fiber sockets 115 (or optical fibers 114 coupled with the fiber array unit 132).

In yet another example, the fifth lens 210 may be coupled with the PIC 106 of the second electronic device 100. The sixth lens 212 may be coupled with the PIC 106 of the second electronic device 100. For example, a third optical interconnect 112C may be aligned with the lens 210. A fourth optical interconnect 112D may be aligned with the lens 212. Accordingly, a photonic signal communicated by the optical interconnects 112D may be transmitted through the lens 210. In another example, a photonic signal communicated by the optical interconnect 112D may be transmitted through the lens 210. Accordingly, the lenses 410, 412 may be associated with individual ones of the optical interconnects 112.

Figure 3:
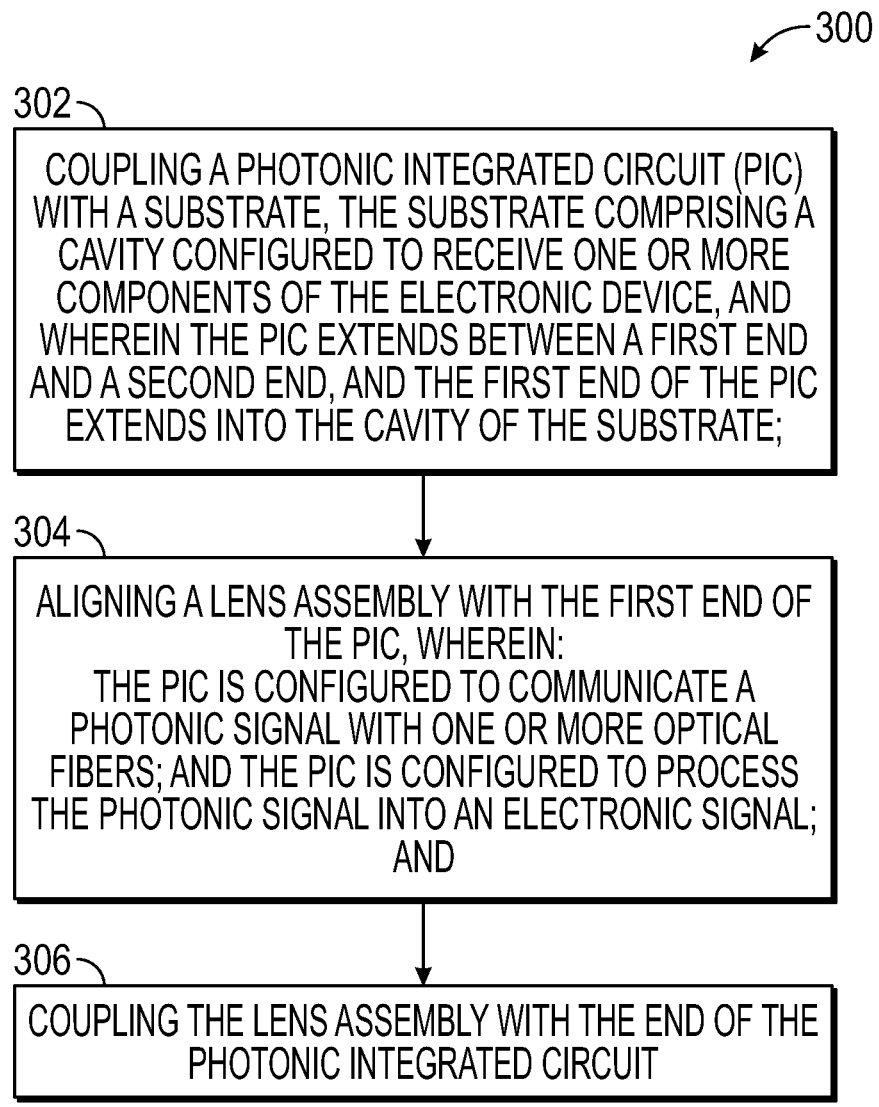
FIG. 3 shows one example of a method for manufacturing an electronic device, including one or more of the electronic device described herein.

FIG. 3 shows one example of a method 300 for manufacturing an electronic device, including one or more of the electronic device 100 described herein. In describing the method 300, reference is made to one or more components, features, functions and operations previously described herein. Where convenient, reference is made to the components, features, operations and the like with reference numerals. The reference numerals provided are exemplary and are not exclusive. For instance, components, features, functions, operations and the like described in the method 300 include, but are not limited to, the corresponding numbered elements provided herein and other corresponding elements described herein (both numbered and unnumbered) as well as their equivalents.

The method 300 includes at 302, a photonic integrated circuit 106 may be coupled with a substrate 102. The substrate 102 may comprise a cavity 104. The cavity 104 may receive one or more components of the electronic device 100. For instance, the PIC 106 may extend into the cavity 104. In an example, the first end 126 of the PIC 106 may extend into the cavity 104 of the substrate 104.

At 304, the method 300 includes aligning a lens assembly 116 with the end 126 of the PIC 106. For instance, the assembly 116 may include a first lens 118. The first lens may include a PIC socket 128. The PIC socket 128 may receive the PIC 106. For instance, the PIC socket 128 may receive the first end 126 of the PIC 106. The method 300 includes at 306, the lens assembly 116 may be coupled with the end 126 of the PIC 106. For instance, the first end 126 of the PIC 106 may be located in the PIC socket 128 of the PIC 106. In another example, an edge 124 of the PIC 106 may form a direct interface with the lens assembly 116.

Several options for the method 300 follow. In an example, the photonic integrated circuit 106 may be coupled with an electronic integrated circuit 108. The electronic integrated circuit 108 may transmit an electronic signal to the PIC 106. The electronic integrated circuit 107 may receive the electronic signal from the PIC 106. In another example, a fiber array unit 132 may be located in the cavity 104 of the substrate 102.

Figure 4:
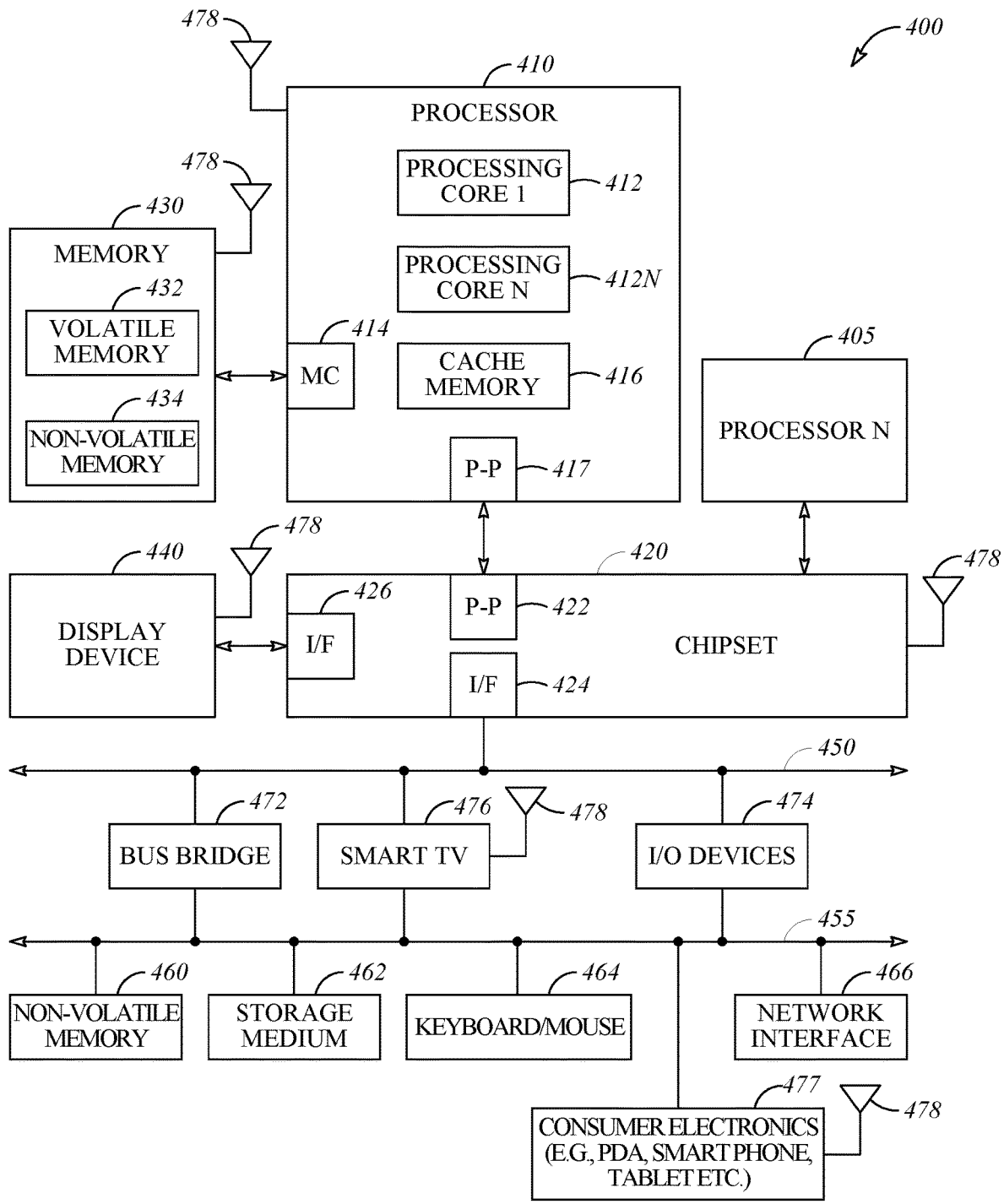
FIG. 4 shows a system level diagram, depicting an example of an electronic device (e.g., system) including one or more of the electronic device of FIG. 1 or the electronic system of FIG. 2.

FIG. 4 shows a system level diagram, depicting an example of an electronic device (e.g., system) including one or more of the electronic device 100 or the electronic system 200 as described in the present disclosure. FIG. 4 is included to show an example of a higher level device application for one or more of the electronic device 100 or the electronic system 200. In one embodiment, system 400 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 400 is a system on a chip (SOC) system.

In one embodiment, processor 410 has one or more processor cores 412 and 412N, where 412N represents the Nth processor core inside processor 410 where N is a positive integer. In one embodiment, system 400 includes multiple processors including 410 and 405, where processor 405 has logic similar or identical to the logic of processor 410. In some embodiments, processing core 412 includes, but is not limited to, pre-fetch logic to fetch instructions, decode logic to decode the instructions, execution logic to execute instructions and the like. In some embodiments, processor 410 has a cache memory 416 to cache instructions and/or data for system 400. Cache memory 416 may be organized into a hierarchal structure including one or more levels of cache memory.

In some embodiments, processor 410 includes a memory controller 414, which is operable to perform functions that enable the processor 410 to access and communicate with memory 430 that includes a volatile memory 432 and/or a non-volatile memory 434. In some embodiments, processor 410 is coupled with memory 430 and chipset 420. Processor 410 may also be coupled to a wireless antenna 478 to communicate with any device configured to transmit and/or receive wireless signals. In one embodiment, an interface for wireless antenna 478 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 432 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 434 includes, but is not limited to, flash memory, phase change memory (PCM), read-only memory (ROM), electrically erasable programmable read-only memory (EEPROM), or any other type of non-volatile memory device.

Memory 430 stores information and instructions to be executed by processor 410. In one embodiment, memory 430 may also store temporary variables or other intermediate information while processor 410 is executing instructions. In the illustrated embodiment, chipset 420 connects with processor 410 via Point-to-Point (PtP or P-P) interfaces 417 and 422. Chipset 420 enables processor 410 to connect to other elements in system 400. In some embodiments of the example system, interfaces 417 and 422 operate in accordance with a PtP communication protocol such as the Intel® QuickPath Interconnect (QPI) or the like. In other embodiments, a different interconnect may be used.

In some embodiments, chipset 420 is operable to communicate with processor 410, 405N, display device 440, and other devices, including a bus bridge 472, a smart TV 476, I/O devices 474, nonvolatile memory 460, a storage medium (such as one or more mass storage devices) 462, a keyboard/mouse 464, a network interface 466, and various forms of consumer electronics 477 (such as a PDA, smart phone, tablet etc.), etc. In one embodiment, chipset 420 couples with these devices through an interface 424. Chipset 420 may also be coupled to a wireless antenna 478 to communicate with any device configured to transmit and/or receive wireless signals.

Chipset 420 connects to display device 440 via interface 426. Display 440 may be, for example, a liquid crystal display (LCD), a plasma display, cathode ray tube (CRT) display, or any other form of visual display device. In some embodiments of the example system, processor 410 and chipset 420 are merged into a single SOC. In addition, chipset 420 connects to one or more buses 450 and 455 that interconnect various system elements, such as I/O devices 474, nonvolatile memory 460, storage medium 462, a keyboard/mouse 464, and network interface 466. Buses 450 and 455 may be interconnected together via a bus bridge 472.

In one embodiment, mass storage device 462 includes, but is not limited to, a solid state drive, a hard disk drive, a universal serial bus flash memory drive, or any other form of computer data storage medium. In one embodiment, network interface 466 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 4 are depicted as separate blocks within the system 400, the functions performed by some of these blocks may be integrated within a single semiconductor circuit or may be implemented using two or more separate integrated circuits. For example, although cache memory 416 is depicted as a separate block within processor 410, cache memory 416 (or selected aspects of 416) can be incorporated into processor core 412.

Various Notes and Examples

Example 1 is an electronic device, comprising: a substrate including one or more electrical traces and a dielectric material, the substrate comprising a cavity configured to receive one or more components of the electronic device; a photonic integrated circuit (PIC) coupled with the substrate, the PIC including one or more optical interconnects, wherein: the PIC is configured to communicate a photonic signal with one or more optical fibers; and the PIC is configured to process the photonic signal into an electronic signal; the PIC extends between a first end and a second end, and the first end of the PIC extends into the cavity in the substrate; an electronic integrated circuit (EIC) coupled with the substrate, wherein the EIC is in communication with the PIC, and the EIC is configured to transmit the electronic signal to the PIC or to receive the electronic signal from the PIC; and a lens assembly in the cavity, wherein: the lens assembly is coupled with the first end of the PIC; the optical interconnects of the PIC are aligned with the lens assembly such that the lens assembly is configured to transmit the photonic signal communicated between PIC and the optical fibers.

In Example 2, the subject matter of Example 1 optionally includes wherein: the PIC includes a first surface and a second surface, and an edge of the PIC extends between the first surface and the second surface; and the lens assembly forms a direct interface with the edge of the PIC.

In Example 3, the subject matter of any one or more of Examples 1-2 optionally include wherein: the PIC includes a first surface and a second surface, and an edge of the PIC extends between the first surface and the second surface; and the lens assembly is coupled with the first surface, the second surface, and the edge of the PIC.

In Example 4, the subject matter of Example 3 optionally includes wherein the lens assembly is coupled to the PIC with an interference fit.

In Example 5, the subject matter of any one or more of Examples 3-4 optionally include an adhesive between the lens assembly and the PIC.

In Example 6, the subject matter of Example 5 optionally includes wherein the adhesive is between the substrate and the lens assembly.

In Example 7, the subject matter of any one or more of Examples 1-6 optionally include wherein the lens assembly cooperates with the PIC to inhibit warping of the edge of the PIC.

In Example 8, the subject matter of any one or more of Examples 1-7 optionally include wherein the lens assembly comprises a socket configured to receive the first end of the PIC.

In Example 9, the subject matter of any one or more of Examples 1-8 optionally include wherein: the PIC includes a first surface and a second surface, and an edge of the PIC extends between the first surface and the second surface; and the optical interconnect comprises an edge coupler exposed at the edge of the PIC.

In Example 10, the subject matter of any one or more of Examples 1-9 optionally include micrometers.

In Example 11, the subject matter of any one or more of Examples 1-10 optionally include wherein the lens assembly is coupled with the first and second surfaces of the PIC.

In Example 12, the subject matter of any one or more of Examples 1-11 optionally include wherein the lens assembly comprises a plurality of lenses.

In Example 13, the subject matter of any one or more of Examples 1-12 optionally include a fiber array unit configured for coupling with the one or more optical fibers.

In Example 14, the subject matter of any one or more of Examples 1-13 optionally include wherein the fiber array unit extends into the cavity of the substrate.

Example 15 is an electronic device, comprising: a substrate including one or more electrical traces and a dielectric material, the substrate comprising a cavity configured to receive one or more components of the electronic device; a photonic integrated circuit (PIC) coupled with the substrate, the PIC including one or more optical interconnects, wherein: the PIC is configured to communicate a photonic signal with one or more optical fibers; and the PIC is configured to process the photonic signal into an electronic signal; the PIC extends between a first end and a second end, and the first end of the PIC extends into the cavity; an electronic integrated circuit (EIC) coupled with the substrate, wherein the EIC is in communication with the PIC, and the EIC is configured to transmit the electronic signal to the PIC or to receive the electronic signal from the PIC; a lens assembly in the cavity, wherein: the lens assembly is coupled with the first end of the PIC; the optical interconnects of the PIC are aligned with the lens assembly such that the communicated photonic signal communicated between PIC and the optical fibers are transmitted through the lens assembly; and a fiber array unit configured for coupling with the one or more optical fibers, wherein the fiber array unit extends into the cavity of the substrate.

In Example 16, the subject matter of Example 15 optionally includes wherein the lens assembly is separated from the fiber array unit by a transmission gap, and the photonic signal is communicated between the PIC and the fiber array unit through the transmission gap.

In Example 17, the subject matter of any one or more of Examples 15-16 optionally include wherein: the lens assembly comprises a first lens coupled with the PIC and a second lens coupled with the fiber array unit; and the first lens is aligned with the second lens to transmit the photonic signal between the first lens and the second lens.

In Example 18, the subject matter of any one or more of Examples 15-17 optionally include wherein: the PIC includes a first surface and a second surface, and an edge of the PIC extends between the first surface and the second surface; and the lens assembly forms a direct interface with the edge of the PIC.

In Example 19, the subject matter of any one or more of Examples 15-18 optionally include wherein: the PIC includes a first surface and a second surface, and an edge of the PIC extends between the first surface and the second surface; and the lens assembly is coupled with the first surface, the second surface, and the edge of the PIC.

Example 20 is a method for manufacturing an electronic device, the method comprising: coupling a photonic integrated circuit (PIC) with a substrate, the substrate comprising a cavity configured to receive one or more components of the electronic device, and wherein the PIC extends between a first end and a second end, and the first end of the PIC extends into the cavity of the substrate; aligning a lens assembly with the first end of the PIC, wherein: the PIC is configured to communicate a photonic signal with one or more optical fibers; and the PIC is configured to process the photonic signal into an electronic signal; and coupling the lens assembly with the end of the photonic integrated circuit.

In Example 21, the subject matter of Example 20 optionally includes wherein the lens assembly comprises a socket configured to receive the first end of the PIC, the method further comprising: locating the first end of the PIC in the socket of the lens assembly.

In Example 22, the subject matter of any one or more of Examples 20-21 optionally include coupling the photonic integrated circuit with an electronic integrated circuit, wherein the electronic integrated circuit is configured to transmit the electronic signal to the PIC or to receive the electronic signal from the PIC.

In Example 23, the subject matter of any one or more of Examples 20-22 optionally include forming a direct interface between the lens assembly and an edge of the PIC.

In Example 24, the subject matter of any one or more of Examples 20-23 optionally including wherein the PIC includes a first surface and a second surface, and a thickness of the PIC between the first surface and the second surface is less than or equal to approximately 200 micrometers.

In Example 25, the subject matter of any one or more of Examples 20-24 optionally including locating a fiber array unit within the cavity of the substrate.

Each of these non-limiting examples can stand on its own, or can be combined in various permutations or combinations with one or more of the other examples.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined by reference to the appended claims, along with the full scope of equivalents to which such claims are entitled.

The claimed invention is:

1. An electronic device, comprising:
   a substrate including one or more electrical traces and a dielectric material, the substrate comprising a cavity configured to receive one or more components of the electronic device;
   a photonic integrated circuit (PIC) coupled with the substrate, the PIC including one or more optical interconnects, wherein:
      the PIC is configured to communicate a photonic signal with one or more optical fibers;
      the PIC is configured to process the photonic signal into an electronic signal;
      the PIC extends between a first end and a second end;
      the substrate comprises a face, the PIC comprises a face, the PIC face is on the substrate face, and the PIC face extends beyond the substrate face; and
   the PIC includes a first surface and a second surface, and an edge of the PIC extends between the first surface and the second surface;
   an electronic integrated circuit (EIC) coupled with the substrate, wherein the EIC is in communication with the PIC, and the EIC is configured to transmit the electronic signal to the PIC or to receive the electronic signal from the PIC; and
   a lens assembly in the cavity, wherein:
      the lens assembly is coupled with the first end of the PIC and the lens assembly is coupled with the first surface, the second surface, and the edge of the PIC; and
      the one or more optical interconnects of the PIC are aligned with the lens assembly such that the lens assembly is configured to transmit the photonic signal between the PIC and the one or more optical fibers.

2. The electronic device of claim 1, wherein:
   the PIC includes a first surface and a second surface, and an edge of the PIC extends between the first surface and the second surface; and
   the lens assembly forms a direct interface with the edge of the PIC.

3. The electronic device of claim 1, wherein the lens assembly is coupled to the PIC with an interference fit.

4. The electronic device of claim 1, further comprising an adhesive between the lens assembly and the PIC.

5. The electronic device of claim 4, wherein the adhesive is between the substrate and the lens assembly.

6. The electronic device of claim 1, wherein the lens assembly cooperates with the PIC to inhibit warping of an edge of the PIC.

7. The electronic device of claim 1, wherein the lens assembly comprises a socket configured to receive the first end of the PIC.

8. The electronic device of claim 1, wherein:
   the PIC includes a first surface and a second surface, and an edge of the PIC extends between the first surface and the second surface; and
   the one or more optical interconnects comprise an edge coupler exposed at the edge of the PIC.

9. The electronic device of claim 1, wherein the PIC includes a first surface and a second surface, and a thickness of the PIC between the first surface and the second surface is less than or equal to approximately 200 micrometers.

10. The electronic device of claim 1, wherein the lens assembly is coupled with a first and second surfaces of the PIC.

11. The electronic device of claim 1, wherein the lens assembly comprises a plurality of lenses.

12. The electronic device of claim 1, further comprising a fiber array unit configured for coupling with the one or more optical fibers.

13. The electronic device of claim 12, wherein the fiber array unit extends into the cavity of the substrate.

14. An electronic device, comprising:
   a substrate including one or more electrical traces and a dielectric material, the substrate comprising a cavity configured to receive one or more components of the electronic device;
   a photonic integrated circuit (PIC) coupled with the substrate, the PIC including one or more optical interconnects, wherein:
      the PIC is configured to communicate a photonic signal with one or more optical fibers;
      the PIC is configured to process the photonic signal into an electronic signal;
      the PIC extends between a first end and a second end; and
      the substrate comprises a face, the PIC comprises a face, the PIC face is on the substrate face, and the PIC face extends beyond the substrate face;
   an electronic integrated circuit (EIC) coupled with the substrate, wherein the EIC is in communication with the PIC, and the EIC is configured to transmit the electronic signal to the PIC or to receive the electronic signal from the PIC;
   a lens assembly in the cavity, wherein:
      the lens assembly is coupled with the first end of the PIC; and
      the one or more optical interconnects of the PIC are aligned with the lens assembly such that the photonic signal between PIC and the one or more optical fibers is transmitted through the lens assembly; and
   a fiber array unit configured for coupling with the one or more optical fibers, wherein the fiber array unit extends into the cavity of the substrate; and
   the lens assembly is separated from the fiber array unit by a transmission gap, and the photonic signal is communicated between the PIC and the fiber array unit through the transmission gap.

15. The electronic device of claim 14, wherein:

the lens assembly comprises a first lens coupled with the PIC and a second lens coupled with the fiber array unit; and the first lens is aligned with the second lens to transmit the photonic signal between the first lens and the second lens.

16. The electronic device of claim 14, wherein:

the PIC includes a first surface and a second surface, and an edge of the PIC extends between the first surface and the second surface; and the lens assembly forms a direct interface with the edge of the PIC.

17. The electronic device of claim 14, wherein:

the PIC includes a first surface and a second surface, and an edge of the PIC extends between the first surface and the second surface; and the lens assembly is coupled with the first surface, the second surface, and the edge of the PIC.

18. A method for manufacturing an electronic device, the method comprising:

coupling a photonic integrated circuit (PIC) with a substrate, the substrate comprising a cavity configured to receive one or more components of the electronic device, and wherein the PIC extends between a first end and a second end, the PIC extends between a first end and a second end, and-the substrate comprises a face, the PIC comprises a face, the PIC face is on the substrate face, and the PIC face extends beyond the substrate face;

aligning a lens assembly with the first end of the PIC, wherein:

the PIC is configured to communicate a photonic signal with one or more optical fibers; and the PIC is configured to process the photonic signal into an electronic signal; and coupling the lens assembly with the first end of the PIC wherein the lens assembly comprises a socket configured to receive the first end of the PIC, locating the first end of the PIC in the socket of the lens assembly.

19. The method of claim 18, further comprising coupling the photonic integrated circuit with an electronic integrated circuit, wherein the electronic integrated circuit is configured to transmit the electronic signal to the PIC or to receive the electronic signal from the PIC.

20. The method of claim 18, further comprising forming a direct interface between the lens assembly and an edge of the PIC.

21. The method of claim 18, wherein the PIC includes a first surface and a second surface, and a thickness of the PIC between the first surface and the second surface is less than or equal to approximately 200 micrometers.

22. The method of claim 18, further comprising locating a fiber array unit within the cavity of the substrate.

* * * * *